No. 767,742. PATENTED AUG. 16, 1904.
D. R. FERGUSON & A. E. MACCOUN.
FRICTIONAL BRAKE DEVICE FOR HOISTS.
APPLICATION FILED DEC. 17, 1903.
NO MODEL. 2 SHEETS—SHEET 1.

WITNESSES
INVENTORS
Dougald R. Ferguson
Andrew E. Maccoun
by Bakewell & Byrnes
attorneys

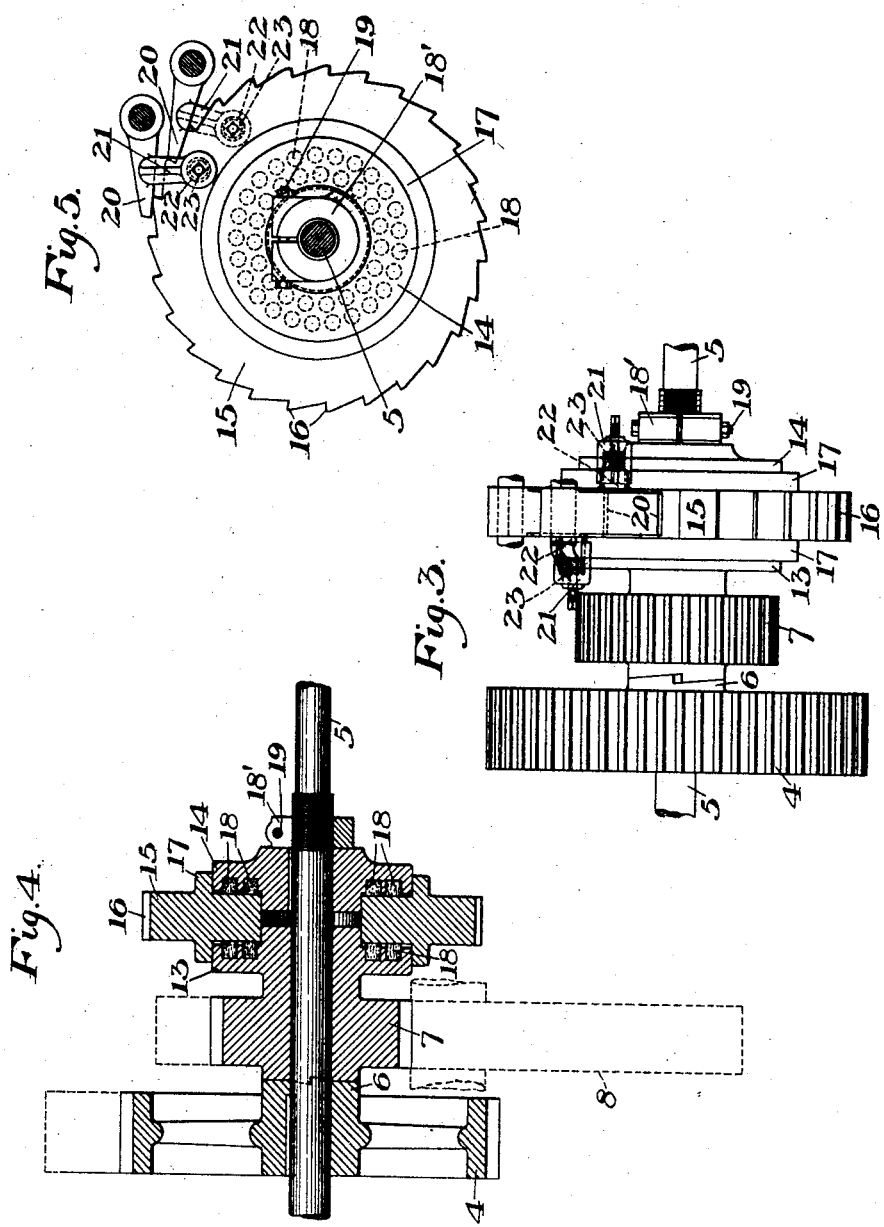

No. 767,742.

Patented August 16, 1904.

UNITED STATES PATENT OFFICE.

DOUGALD R. FERGUSON, OF WILKINSBURG, AND ANDREW E. MACCOUN, OF BRADDOCK, PENNSYLVANIA.

FRICTIONAL BRAKE DEVICE FOR HOISTS.

SPECIFICATION forming part of Letters Patent No. 767,742, dated August 16, 1904.

Application filed December 17, 1903. Serial No. 185,561. (No model.)

*To all whom it may concern:*

Be it known that we, DOUGALD R. FERGUSON, of Wilkinsburg, and ANDREW E. MACCOUN, of Braddock, Allegheny county, Pennsylvania, have invented a new and useful Frictional Brake Device for Hoists, of which the following is a full, clear, and exact description, reference being had to the accompanying drawings, forming part of this specification, in which—

Figure 1:
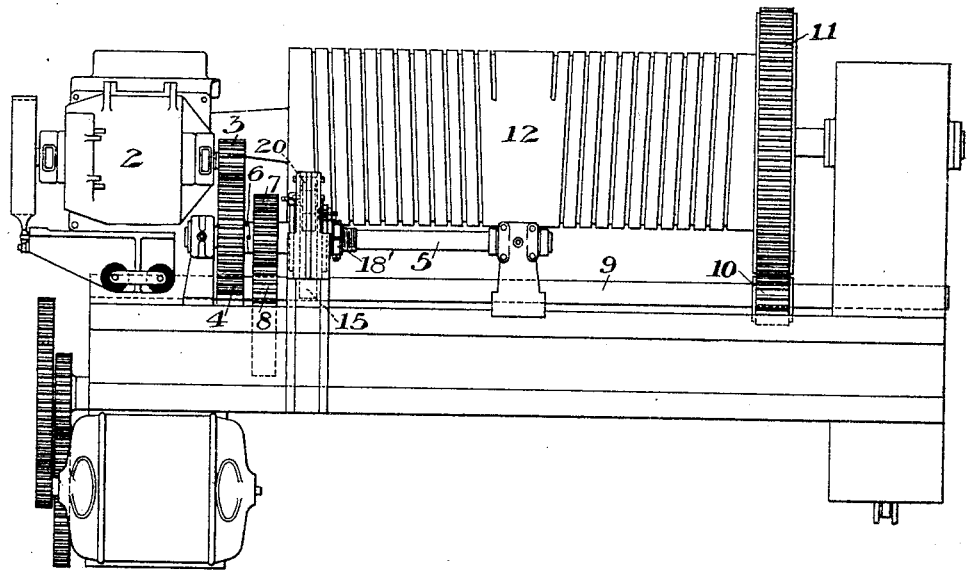
Figure 2:
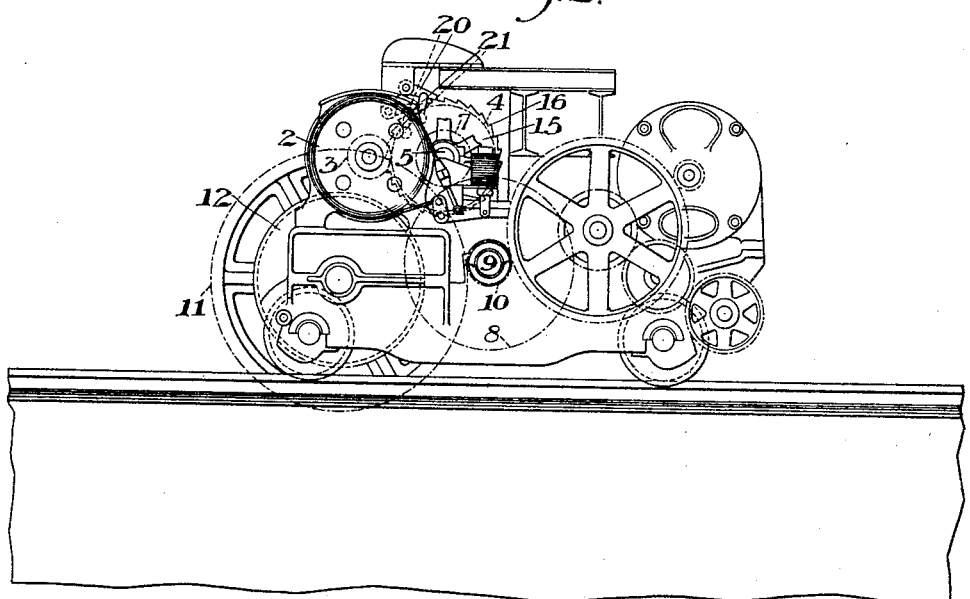

Figure 1 shows a plan, and Fig. 2 a side elevation, of the hoist for an electric traveling crane equipped with our improved clutch. Fig. 3 is a plan view of the clutch, on a larger scale. Fig. 4 is a vertical section of Fig. 3, and Fig. 5 is an end view of the same.

Our invention relates to friction retaining-clutches, and is designed to provide a simple and safe mechanism which will automatically regulate the speed of a hoist and prevent it from running away and wrecking the crane. It is also designed to overcome the heating and consequent binding or sticking of the clutches now used, which cause expensive delays and repairs. It is further designed to provide convenient means for adjusting the clutch to compensate for wear.

The invention consists of a friction-disk which revolves freely when the load is being lifted, but which is automatically gripped in lowering when the speed exceeds a safe limit, friction devices being pressed against each side of the disk in such case until the speed is reduced to bring it within the safe limit.

In the drawings, 2 represents the drum-operating motor having a pinion 3 engaging a toothed wheel 4, which is keyed to a counter-shaft 5. The wheel 4 has a hub with helical cam-faces 6, engaging similar cam-faces on the hub of a toothed wheel 7, which is loose on the shaft 5 and which engages a pinion 8 upon shaft 9. These two cam-faces have shoulders which form a crab-clutch connection in lifting. A pinion 10 on shaft 9 engages toothed wheel 11 on the drum 12 of the hoist.

The hub of wheel 7 is extended and provided with a friction-disk 13, which coacts with a similar adjustable friction-disk 14, which is splined to the shaft 5. The hubs of the disks 13 and 14 provide a bearing for a central two-faced friction-disk 15, preferably having ratchet-teeth 16 on its periphery. The disk 15 is preferably provided with opposite annular ribs or shoulders 17, which fit over the edges of the disks 13 and 14 and give a bearing to prevent tilting of the disk 15, and to increase the friction we preferably provide the inner faces of the disks 13 and 14 with annular series of holes in which are fitted friction-blocks 18, of wood or suitable material.

In order to keep the three disks accurately fitted together, we provide a split screw-threaded collar 18', which engages screw-threads on the shaft 5 and may be turned to adjust the parts together as they wear under service and then clamped by the bolt 19.

The teeth 16 are engaged by two pawls or detents 20, which are mounted in bearings on the frame, and these detents are held in position and prevented from rattling by projecting fingers 21, having pockets in their ends containing friction-blocks 22, which are pressed against the opposite faces of the disk 15 by springs 23 in the pockets. These finger devices press on opposite faces of the central disk and give even pressure on both sides.

The operation of the device is as follows: When the load is being lowered, the two-faced friction-disk 15 is prevented from turning by the detents engaging its teeth. The wheel 4 is driven at a certain speed by the motor, and the helical faces cause the disks to press against the two-faced disk and control the descent. If the speed of the drum increases to such an extent that the wheel 7 is turned at greater speed than the wheel 4, and thus exceeds the safe limit, the helical faces between these wheels will force the friction-faces of the three friction-disks more closely together, and thus check the speed until the two wheels turn at the same speed. The friction-disks will then be partially released from each other and remain so until the speed again exceeds the safe limit.

The advantages of our invention result from the arrangement of the two-faced friction-disk with contacting disks on each side and the means for automatically forcing them into frictional engagement when the speed exceeds the safe limit, also from the means for adjusting the device to take up wear and the means for preventing revolution of the two-faced disk in one direction.

Variations may be made in the form and arrangement of the apparatus without departing from our invention.

We claim—

1. A hoist having a friction-disk, mechanism for preventing the revolution of the disk in one direction, a wheel having connections arranged to positively rotate the same, another wheel loose on the same shaft and having a crab-clutch connection with helical faces engaging the positively-turned wheel, a friction-disk connected to the endwise-movable wheel, and connections arranged to turn the loose wheel in accordance with the speed of lowering; substantially as described.

2. A hoist having a shaft, a wheel thereon having positive driving connections, another wheel loose on the shaft and having a crab-clutch connection with helical faces engaging the positively-driven wheel, a friction retaining-clutch actuated by endwise movement of the loose wheel, and connections arranged to turn the loose wheel in accordance with the speed of lowering; substantially as described.

3. A hoist having a shaft, a wheel keyed thereto and positively rotated, another wheel loose on the shaft and having a crab-clutch with inclined faces engaging the positively-turned wheel, a pair of friction-disks, one connected to the loose wheel, and a two-faced friction-disk between said disks and having means for preventing its rotation in one direction; substantially as described.

4. A hoist having two friction-disks, a two-faced disk between them, mechanism for preventing the two-faced disk from turning in one direction, a crab-clutch connection between one of the outer friction-disks and a wheel turned by the motor, and inclined faces on the clutch arranged to force the three disks together during lowering; substantially as described.

5. A hoist having a two-faced friction-disk, with friction-disks on each side thereof having hub portions spaced apart, the two-faced disk bearing against the hub portions of the two outer disks and having also bearing portions on the peripheries of said disks; substantially as described.

In testimony whereof we have hereunto set our hands.

DOUGALD R. FERGUSON.
ANDREW E. MACCOUN.

Witnesses:
G. E. F. GRAY,
THOS. LAMB.